United States Patent [19]

Osanai

[11] 4,154,341
[45] May 15, 1979

[54] TAPE CASSETTE CASE

[75] Inventor: Akira Osanai, Hachioji, Japan

[73] Assignee: Olympus Optical Co., Ltd., Tokyo, Japan

[21] Appl. No.: 868,387

[22] Filed: Jan. 10, 1978

[30] Foreign Application Priority Data

Jan. 18, 1977 [JP] Japan ............................... 52-4542[U]
Jan. 18, 1977 [JP] Japan ............................... 52-4543[U]

[51] Int. Cl.² .......................... B65D 85/67; G05G 1/00
[52] U.S. Cl. ..................................... 206/387; 74/575; 206/405; 400/207
[58] Field of Search ...................... 206/387, 405, 406; 220/339; 197/151; 75/575, 577

[56] References Cited

U.S. PATENT DOCUMENTS

| | | | |
|---|---|---|---|
| 3,349,887 | 10/1967 | Goff, Jr. | 197/151 |
| 3,737,067 | 6/1973 | Palson | 220/339 |
| 3,876,071 | 4/1975 | Neal et al. | 206/387 |

Primary Examiner—William T. Dixson, Jr.
Attorney, Agent, or Firm—Lerner, David, Littenberg & Samuel

[57] ABSTRACT

A tape cassette case comprises a pair of locking members disposed for engagement with a pair of tape hubs contained within the cassette, means for rotatably supporting at least one of the locking members, and means for constraining rotation of the locking member in a forward tape feeding direction. The locking member can be externally operated to drive the tape in its forward feeding direction in order to remove a slackened condition or unreeling in the forward feeding direction of the tape contained in the cassette.

8 Claims, 13 Drawing Figures

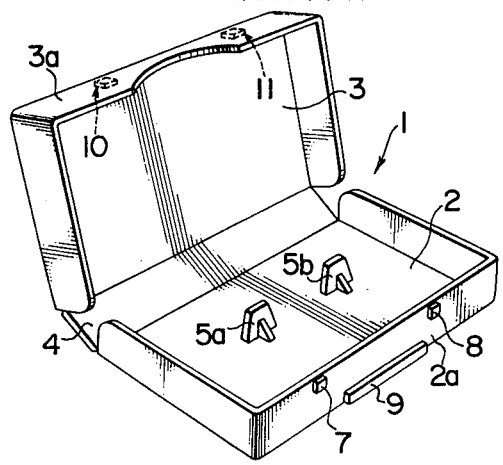
FIG. I
PRIOR ART
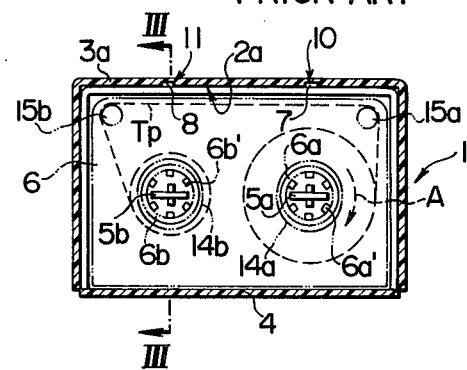
FIG. 2
PRIOR ART
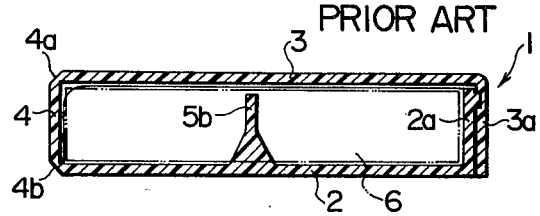
FIG. 3
PRIOR ART

TAPE CASSETTE CASE

BACKGROUND OF THE INVENTION

The invention relates to a tape cassette case.

A length of magnetic tape contained in a tape cassette has its opposite ends anchored to a pair of hubs which are rotatably disposed within the cassette, and is wound on respective hubs. Because both hubs are rotatable relative to the cassette, there is no means in the cassette itself which prevent an unreeling of the magnetic tape. To accommodate this problem, it has been the practice heretofore to provide the cassette case with locking means engaging both hubs to prevent their rotation at least when the cassette is received in the case, thus preventing the unreeling of the tape.

A typical example of the prior art will be described with reference to FIGS. 1 to 3. There is shown a tape cassette case 1 including a box portion 2 and a cover portion 3 which is joined with the box portion by means of a hinge 4. All of these portions are integrally molded from vinyl resin, unsaturated polyester resin or the like. In regions 4a, 4b (see FIG. 3) of the boundary with the box portion 2 and the cover portion 3, the hinge 4 has a reduced thickness to facilitate the folding operation, but there still remains sufficient resilience in the material of the hinge to urge the cover portion 3 away from the box portion 2.

A pair of locking members 5a, 5b are fixedly mounted and spaced from each other on the central portion of the box portion 2 for preventing the unreeling of the tape by engaging with tape hubs 6a, 6b of a tape cassette 6 when it is received in the case (see FIGS. 2 and 3). When the cassette 6 is received within the box portion 2, as indicated by double dot chain line in FIGS. 2 and 3, the tape hubs 6a, 6b are fitted on the locking members 5a, 5b, which prevent their rotation, and hence the unreeling or slackening of the tape. After the cassette 6 is received in the box portion 2, the cover portion 3 is closed over the box portion 2. The box portion 2 has a sidewall 2a on which a pair of detent tabs 7, 8 are provided, with a stop 9 for the cover portion 3 being provided on the bottom of the sidewall. The cover portion 3 has a corresponding sidewall 3a which is internally formed with a pair of recesses 10, 11 for engagement with the detent tabs 7, 8.

The tape cassette 6 is received in the case 1 thus formed, as illustrated in FIG. 2. As is well recognized, the tape hubs 6a, 6b of the cassette 6 are disposed symmetrically with respect to the crosswise centerline thereof and are rotatable in a pair of through-openings 14a, 14b formed through the opposite major faces of the cassette. The hubs 6a, 6b are each adapted to receive a drive shaft (not shown) of a tape recorder. A length of magnetic tape Tp has its opposite ends anchored to the hubs 6a, 6b and is wound thereon. Specifically, a length of tape extends from one of the hubs around a pair of diverting rollers 15a, 15b to the other hub, thus being held taut along the front edge face of the cassette.

When the cassette 6 is received in the case 1, the locking members 5a, 5b provided on the bottom wall of the case 1 are fitted into center openings in the hubs 6a, 6b and engage between tabs 6a', 6b' which extend radially inward from the wall of the openings, whereby the rotation of the hubs is prevented. Thus, it will be seen that the tape Tp will be held taut and no slackening thereof will occur if the locking members 5a, 5b can be engaged with the tape hubs 6a, 6b under the condition that the hub 6a is sufficiently rotated in the direction of an arrow A to maintain the tape taut. However, in the conventional arrangement, there is a certain amount of tolerance between the tabs 6a', 6b' and the locking members 5a, 5b to permit a rattling of the latter, and this makes it difficult, if not impossible, to maintain the tape taut in the presence of vibrations which may be caused during the shipment. On the other hand, if the tape is slackened before the cassette is inserted into the case, there is provided no means in the prior art arrangement which can be utilized to eliminate the slackening. As a consequence, the tape Tp remains slack, which may cause a twisting or folding of the tape to degrade its performance.

It will also be seen that the cassette 6 itself is not capable of preventing the rotation of the tape hubs, so that when it is removed from a tape recorder (not shown), the hubs are free to rotate, thus immediately causing an unreeling or slackening of the tape. Hence, it will be desirable to use a sharp member such as pencil or the like to rotate the hubs to achieve a taut condition of the magnetic tape when inserting the cassette 6 into the case 1. However, this requires some tool, and if the hubs are rotated in a wrong direction, a further slackening of the tape will result. It will thus be seen that the use of fixed locking members cannot achieve a slack-free tape condition when the cassette is received in the case or cannot correct any slackening of the tape.

SUMMARY OF THE INVENTION

It is a first object of the invention to provide a case for receiving a tape cassette including a locking member which is rotatable with a certain degree of friction so that it can be rotated in a direction to remove a slackening in the tape so as to maintain the tape in a taut condition.

With the present invention, the tape can be maintained free from a slackening when the cassette is received in the case. The locking member can be simply molded from a plastic material, and can be simply mounted in place, thus avoiding an increase in the cost.

It is a second object of the invention to provide a case for receiving a tape cassette, including a locking member to prevent the rotation of a tape hub and which is rotatably mounted on the case, and also including an escapement mechanism comprising a ratchet wheel and a detent pawl and which permits a rotation of the locking member only in a direction to remove a slackening in the magnetic tape, thus preventing the magnetic tape from becoming slackened once it is tightly wound.

It is a third object of the invention to provide a case for receiving a tape cassette of the type mentioned in the immediately preceding paragraph in which the locking member is associated with an eccentric weight to cause a rotation of the locking member in a direction to remove a slackening in the magnetic tape when the case is disposed in a particular position or when it is subjected to vibrations, thus enabling any slackening produced in the magnetic tape to be automatically eliminated.

BRIEF DESCRIPTION OF THE DRAWINGS

FIG. 1 is a perspective view of a conventional cassette case for receiving a tape cassette;

FIG. 2 is a horizontal transverse section of the case shown in FIG. 1, illustrating a tape cassette received therein;

FIG. 3 is a vertical section taken along the line III—III shown in FIG. 2;

DESCRIPTION OF PREFERRED EMBODIMENTS

Figure 4:
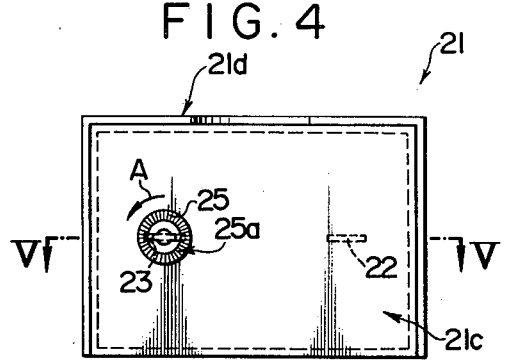
FIG. 4 is a bottom view of a case according to one embodiment of the invention.
Figure 6:
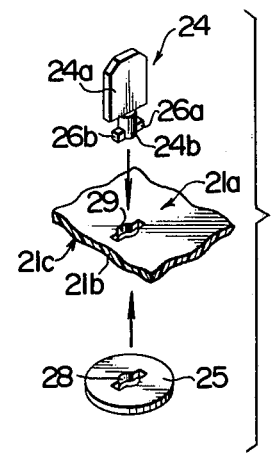
FIG. 6 is an exploded perspective view of the case shown in FIG. 4, illustrating the assembling of the locking member for the tape hub.
Figure 5:
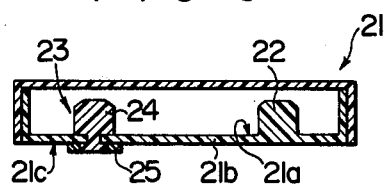
FIG. 5 is a cross section taken along the line V—V shown in FIG. 4.

Referring to FIGS. 4 and 5, there is shown a cassette receiving case 21 having a bottom 21a on which a pair of tape hub locking members 22, 23 are disposed. The member 22 is integrally formed with the case 21 while the other member 23 is rotatable. It will be understood that these locking members 22, 23 are adapted to be fitted into the openings formed in the tape hubs of a tape cassette (not shown) which is to be received in the case, and thus are located at positions corresponding to the locations of these openings in the tape hubs. The locking member 23 is molded from a plastic material having resilience, and comprises a locking piece 24 and a rotatable piece 25, as shown in FIG. 6.

The locking piece 24 includes a tongue 24a in its top portion, which is adapted to engage itself between the radial tabs (not shown) formed inside the opening of the tape hub, while its bottom portion comprises a rotatable stub shaft 24b. A pair of arms 26a, 26b extend in opposite directions from the lower end of the stub shaft 24b and extend in the same plane as that of the tongue 24a. The lower edge of the tongue 24a is spaced from the upper edge of the arms 26a, 26b by a distance which is substantially equal to the thickness of the bottom wall 21b of the case 21. The rotatable piece 25 comprises a disc molded from a plastic material, and is centrally formed with an opening 28 having a shape which conforms to the composite configuration of the stub shaft 24b and arms 26a, 26b. As shown in FIG. 4, bottom surface of the rotatable piece 25 is peripherally knurled at 25a. As will be noted, the bottom wall 21b of the case 21 is formed with an opening 29 in alignment with and in conformity to the opening 28 formed in the rotatable piece 25, the opening 29 being elongated in a direction perpendicular to the front edge 21d of the case 21.

Figure 7:
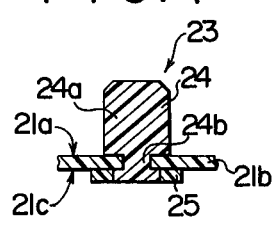
FIG. 7 is a cross section of the locking member after it is assembled in place.

The locking piece 24 and the rotatable piece 25 are assembled with the bottom wall 21b as follows: Referring to FIG. 6, the stub shaft 24b and the arms 26a, 26b of the locking piece 24 are inserted through the opening 29 to extend below the rear surface 21c of the case, and then the rotatable piece 25 is press fitted thereon, thus engaging the opening 28 with these elements. The fitting operation takes place in a simple matter since both members are formed of a resilient plastic molding material. A certain amount of friction can be imparted to the rotation of the locking member 23 by disposing it in abutment against the bottom wall 21b. The amount of friction can be chosen to prevent a rotation of the locking member 23 in response to vibrations which are experienced when carrying about the tape cassette. FIG. 7 is a fragmentary enlarged section which is similar to FIG. 5 except that the locking member 23 is rotated through 90° from the position shown in FIG. 5. Since the direction in which the locking member 23 is to be rotated in order to remove a slackening in the tape is definite, an arrow mark A is provided on the rear surface 21c adjacent to the rotatable piece 25, as shown in FIG. 4, in order to indicate such direction, thus effectively avoiding an inadvertent rotation of the locking member in a wrong direction.

Figure 8:
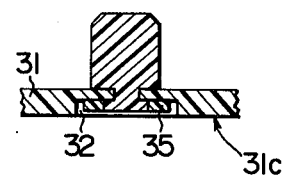
FIG. 8 is a fragmentary cross section of the case constructed in accordance with another embodiment of the invention.

FIG. 8 shows a modification in which a recess 32 is formed in the rear surface 31c of a cassette case 31 in order to receive a rotatable know 35. In all other respects, the arrangement is similar to the previous embodiment, and hence will not be described. This avoids the protrusion of the knob beyond the level of the rear surface of the case, enabling a stabilized stack of cases 31 and avoiding any damage which may be caused to the knobs when a plurality of cases are so stacked.

From the foregoing description, it will be appreciated that the cassette case according to the invention which comprises the locking member is effective not only in preventing a slackening in the tape, but also in removing any slackening which occurs in the tape. The construction is facilitated by a plastic molding, and the assembly is simplified, thus preventing any significant cost increase. While in the embodiments described above, only one of the locking members has been rotatable, it will be appreciated that the both locking members can be arranged to be rotatable.

Referring to FIGS. 9 to 12, another embodiment of the invention will be described in which the locking member is associated with an escape mechanism comprising a ratchet wheel and a detent pawl. A tape cassette receiving case 121 includes a bottom 121a on which a pair of locking members 122, 123 (see FIG. 9) are disposed at positions in alignment with the tape hubs contained in a tape cassette (not shown). The locking member 122 comprises a disc-shaped cassette receiver 122a and an upstanding tongue-shaped locking piece 122b, both of which are integrally molded with the case 121. The other locking member 123 includes a top portion in the form of a locking piece 124 which is of generally similar configuration as the locking piece 122b, a concentric ratchet wheel 126 which is fitted thereon, and a disc-shaped weight member 125 which is coaxially assembled with the lower end of the locking piece 124 and carrying an eccentric weight 131 (see FIG. 10). These elements are rotatably mounted on the bottom wall 121c of the case 121.

The locking piece 124 comprises a tongue 124a (see FIG. 12) which is adapted to be fitted into an opening in a tape hub for engagement between radial tabs formed therein to lock the hub against rotation, a rotatable stub shaft 124b extending from the bottom of the locking piece 124a, and a pair of arms 128a, 128b which extend in opposite directions from the lower end of the stub shaft 124b in a common plane with the tongue 124a. The lower edge of the tongue 124a is spaced from the upper edge of the arms by a distance which is equal to the thickness of the bottom wall 121c.

Figure 9:
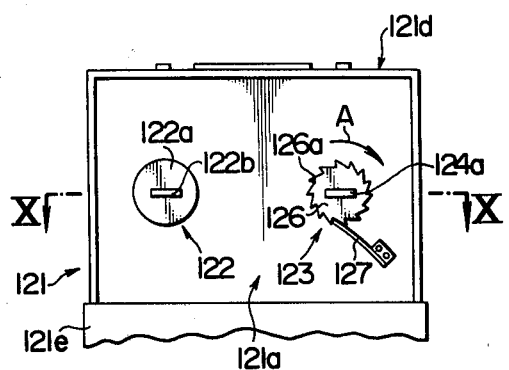
FIG. 9 is a plan view of the box portion of a cassette receiving case which is constructed in accordance with a further embodiment of the invention.
Figure 12:
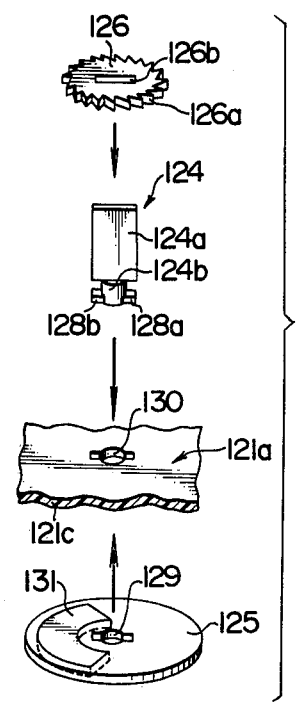
FIG. 12 is an exploded, perspective view of the case shown in FIG. 9, illustrating the assembling of the locking member.
Figure 13:
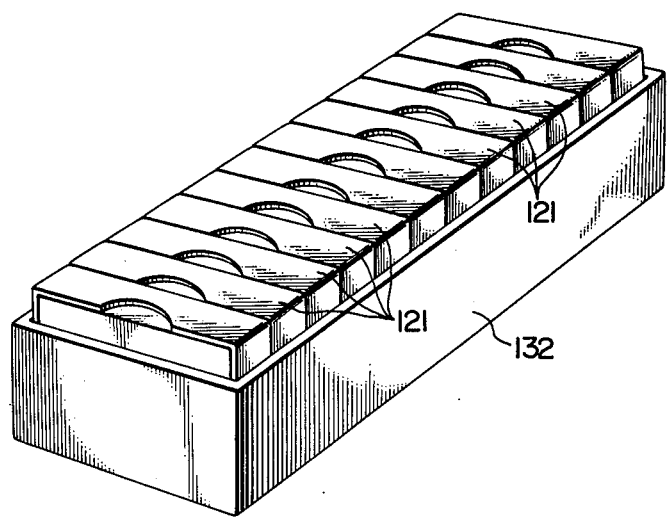
FIG. 13 is a perspective view of a plurality of cassette receiving cases of the invention which are received in a containment housing.

As shown in FIG. 12, the ratchet wheel 126 comprises a disc which is peripherally formed with ratchet teeth 126a and which is centrally formed with an elongated slot 126b through which the tongue 124a extends. As shown in FIG. 9, the teeth 126a are engaged by a resilient pawl 127 mounted on the bottom 121a of the case for allowing rotation of the locking member 123 in a direction indicated by an arrow A while preventing its rotation in the opposite direction.

As shown in FIG. 12, the weight member 125 comprises a disc of a plastic material or the like which has a greater diameter than the ratchet wheel 126. The member 125 is centrally formed with an opening 129 into which the lower end of the locking piece 124 can be press fitted. An eccentric weight such as a fan-shaped metal plate is integrally assembled with the member 125 on the left-hand side of the opening 129, as viewed in FIG. 12. In the region where the described members are assembled together, the bottom wall 120c of the case is formed with an opening 130 which is similar in configuration but slightly greater than the opening 129 formed in the weight member 125. The lengthwise direction of the opening 130 is perpendicular to the front edge 121d (see FIG. 9) of the case 121.

In assembly, the slot 126b of the ratchet wheel 126 is fitted on the tongue 124a until it becomes flush with the lower end face of the tongue. Because both of these members are formed of a plastic molding material, a suitable resilience is available to fix them in place by a force-fit. The locking piece 124 assembled with the ratchet wheel 126 has its stub shaft 124b and arms 128a, 128b inserted through the opening 130 until the latter projects below the rear surface 121b. The opening 129 of the weight member 125 is fitted on the stub shaft and the arms, thus securing the entire assembly in place.

Figure 10:
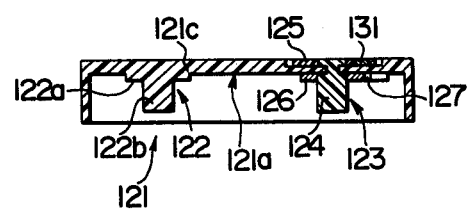
FIG. 10 is a cross section taken along the line X—X shown in FIG. 9.
Figure 11:
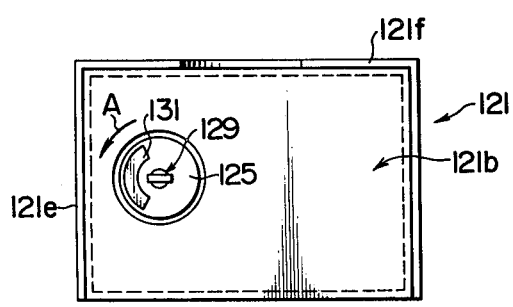
FIG. 11 is a bottom view of the case shown in FIG. 9.

When assembled in this manner, the locking member 123 is rotatable relative to the bottom wall 121c of the case, as illustrated in FIG. 10. When the case 121 is placed as shown in FIG. 11 so that the front portion 121f of the cover 121e of the case 121 is directed vertically upward, the eccentric weight 131 will be located on the left-hand side of the member 125, whereby its weight urges the locking member 123 to rotate counter-clockwise. In this manner, the locking piece 124 is urged in a direction to remove any slackening in the tape (not shown) disposed on the pair of tape hubs (not shown) which are engaged by the locking members 122, 123.

With the cassette case 121 of the invention thus constructed, when a plurality of cases 121 are contained in a containment housing 132 with the front portion 121f directed upward or in the presence of vibrations imparted thereto, the weight member 125 tends to rotate in a direction to remove any slackening in the tape, causing a corresponding rotation of the locking piece 124 and the ratchet member 126 in the same direction, while a reverse rotation of the locking piece 124 is prevented by the functioning of the ratchet wheel 126, thus automatically preventing an unreeling or slackening of the tape. In addition, a slackening in the tape can be removed by shaking the case 121 with hand to rotate the weight member 125 in the direction of arrow.

With the tape cassette described above, the cooperation between the ratchet wheel and the pawl is effective to eliminate an unreeling or slackening in the tape from occurring in response to a considerable amount of vibration, and the use of weight member automatically eliminates any slackening in the tape, thus reliably maintaining a high performance of the magnetic tape. Since the construction is facilitated by a mere combination of molded parts, there is no significant cost increase.

What is claimed is:

1. A case for receiving a magnetic tape cassette including a pair of locking members mounted in said case which are adapted to be fitted into tape hubs provided on the part of the tape cassette for preventing their rotation, characterized in that at least one of the locking members is rotatably mounted on the bottom of the case and includes a portion which permits manual rotation of the said one locking member to remove any slack in the tape within the tape cassette, and means provided between said one locking member and the bottom of the case for constraining rotation of said one locking member when said portion is released after adjustment.

2. A case according to claim 1 in which the constraining means is achieved by maintaining a rotatable portion of the locking member which projects externally of the case bottom in frictional engagement with the bottom surface of the case.

3. A case according to claim 2 in which the case is formed with a recess in the region of its bottom where the rotatable portion is disposed, the recess having a depth greater than the thickness of the rotatable portion received therein.

4. A case according to claim 1, further including an index marked on the case surface adjacent to the rotatable locking member for indicating the direction in which the locking member is to be rotated in order to remove any slackening in the magnetic tape.

5. A case according to claim 1 in which the constraining means comprises an escapement mechanism including a ratchet wheel integral with the rotatable locking member, and a detent pawl for allowing rotation of the ratchet wheel only in a direction in which a slackening in the tape can be removed by the locking member.

6. A case according to claim 5 in which the the rotatable locking member is associated with an eccentric weight located at a position displaced from the center of rotation of the rotatable locking member and adapted to urge the rotatable locking member in a direction to remove slack from the tape of a cassette mounted therein.

7. The case according to claim 1 wherein the rotatable locking member comprises a tongue having a projection extending through an opening in the case; said constraining means being positioned against the bottom of said case and being secured to the projection of said locking member.

8. The case according to claim 7 wherein the constraining means frictionally engages the case to restrain the locking member from rotating.

* * * * *